Patented Jan. 3, 1950

2,493,729

UNITED STATES PATENT OFFICE 2,493,729

1-ALKYL-2-PHENYL-3-ALKYL INDANES AND PROCESS OF MANUFACTURE

Ulrich V. Solmssen, Essex Fells, N. J., assignor to Hoffmann-La Roche Inc., Nutley, N. J., a corporation of New Jersey No Drawing. Application October 23, 1946, Serial No. 705,235

11 Claims. (Cl. 260—613)

The present invention relates to the production of 1-alkyl-2-phenyl-3-alkyl-indanes which can be represented by the following general formula:

(I)
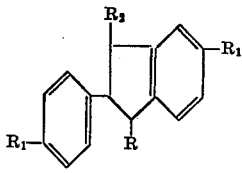

wherein R represents an alkyl radical which may be a straight-chain or a branched-alkyl, $R_1$ represents an oxygen containing radical, such as hydroxyl, alkoxy and acyloxy and $R_2$ represents alkyl.

In my copending application, Serial No. 550,869, filed August 23, 1944, now U. S. Patent 2,447,099, there are disclosed indene derivatives of the following general formula:

(II)
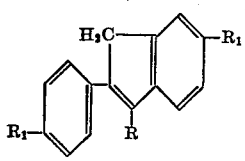

wherein $R_1$ has the same significance as in the above formula and R is a lower alkyl group containing at least two carbon atoms. In Salzer Patent No. 2,281,956, there are disclosed compounds of Formula II, where R stands for a methyl group only. The compounds of Formula II are also disclosed in my article "The synthesis of estrogenic indene derivatives and remarks on the configuration of stilbestrol," the Journal of the American Chemical Society, volume 65, page 2370 (1930).

The above-described indenes are employed as starting materials for the production of the compounds of the present invention. According to my invention, such indenes are converted into the indanes of Formula I by reacting the indenes with aldehydes as, for example, formaldehyde, paraformaldehyde, formaldehyde-yielding compounds and the like to obtain the corresponding fulvenes. The fulvenes are then hydrogenated to yield the 1,3-dialkyl-2-phenyl-indanes, the exocyclic and the 2,3-double bonds being simultaneously reduced. To obtain the hydroxy derivatives, the alkoxy or acyloxy derivatives are then dealkylated. The process can be represented by the following equation, wherein formaldehyde is employed as the aldehyde.

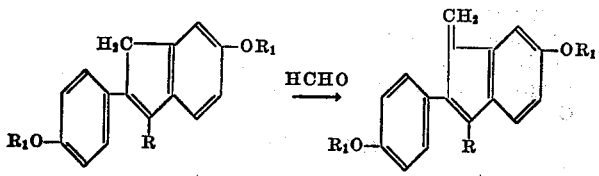

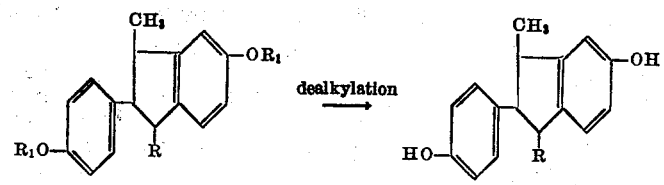

In the above equation R and $R_1$ are alkyl radicals such as methyl, ethyl, propyl, and the like.

This process is particularly valuable for producing new indanes of Formula I wherein the alkyl substituents in the 1- and 3-positions are identical, as, for example, 1-methyl-2-(p-hydroxyphenyl)-3-methyl-6-hydroxy-indane; and wherein the alkyl substituents in said positions differ from one another by more than one carbon atom, as for example, 1-methyl-2-(p-methoxyphenyl)-3-isopropyl-6-hydroxy-indane. Another advantage of the process is that excellent yields are obtained thereby.

By employing indenes as starting materials in which the 3-position is substituted by a branched alkyl as, for example, isopropyl, isobutyl, tertiary butyl, isoamyl and the like, the corresponding 1 - alkyl - 3 - branched - alkyl - indanes are obtained.

The indanes comprising my invention have pronounced estrogenic activity and are suitable for administration orally, parenterally or sublingually. The 1-alkyl-3-branched-alkyl-indanes are particularly characterized by their exceptionally high estrogenic activity in addition to their stability.

When obtained in the form of the phenols, that is where $R_1$ in the generic Formula I is —OH, the dihydroxy-1-alkyl-3-alkyl-indanes can be readily transformed into the corresponding esters by acylation with acyl chlorides or anhydrides, with or without the addition of catalysts or acid-binding agents. For example, the acetates can be made by heating the phenolic compounds with acid anhydrides in the presence of a small amount of sulfuric acid. Propionates can be obtained by reacting the phenols with propionyl chloride in pyridine. Other esters can be produced in similar manner.

The ethers can be prepared by the phenols by alkylation with suitable alkylating agents such as diazomethane, alkyl halides, such as methyl or ethyl chlorides or iodides; alkyl sulfates, dialkyl sulphates, or alkyl sulfites, as for instance, methyl or ethyl sulfates and sulfites in the presence of suitable acid-binding agents as, for example, potassium carbonate, silver oxide, sodium hydroxide and the like.

In general, the preferred method of practicing the process is to react a 2-(p-alkoxyphenyl)-3-alkyl-6-alkoxy-indene with an aldehyde as, for example, paraformaldehyde, to hydrogenate the resulting fulvene and then to wholly or partially dealkylate the dialkyl ether so obtained to convert at least one of the alkoxy groups into a hydroxyl. By controlling the dealkylation, only one alkoxy group can be dealkylated and the resultant free hydroxy group can then be acylated as described above. In this way, mixed ether-esters, can be obtained. Such mixed ether-esters of 1,3-dialkyl-2-hydroxyphenyl-hydroxy-indanes have the advantage of having a more prolonged estrogenic activity as compared with the dihydroxy compounds.

In the manner described, compounds corresponding to the Formula I can be prepared where R is methyl, ethyl, propyl, isopropyl, butyl, isobutyl, tertiary butyl and the like, as for example:

1-methyl-2-(p-hydroxyphenyl)-3-methyl-6-hydroxy-indane 1-methyl-2-(p-methoxyphenyl)-3-methyl-6-hydroxy-indane 1-methyl-2-(p-hydroxyphenyl)-3-methyl-6-methoxy-indane 1-methyl-2-(p-propionoxyphenyl)-3-methyl-6-propionoxy-indane 1-methyl-2-(p-propionoxyphenyl)-3-methyl-6-hydroxy-indane 1-methyl-2-(p-propionoxyphenyl)-3-methyl-6-methoxy-indane 1-methyl-2-(p-hydroxyphenyl-3-isopropyl-6-hydroxy-indane 1-methyl-2-(p-acetoxyphenyl-3-isopropyl-6-acetoxy-indane 1-methyl-2-(p-methoxyphenyl)-3-isopropyl-6-methoxy-indane 1-methyl-2-(p-methoxyphenyl)-3-butyl-6-methoxy-indane 1-methyl-2-(p-methoxyphenyl)-3-isobutyl-6-methoxy-indane The maximum estrogenic activity is exhibited by those compounds containing a branched alkyl radical in the 3-position, particularly those containing an isopropyl radical in this position. Such isopropyl compounds have been found to be active in doses of about one microgram when given subcutaneously and 5.6 micrograms when given orally in ovarectomized rats.

The 3-branched-alkyl-indenes which are employed as starting materials to produce the 1-alkyl-3-branched-alkyl-indanes may be prepared according to the general procedure described in my above-mentioned article. Thus, by reacting in the same manner as described the indanone (XVI) with a branched alkyl magnesium halide as, for example, any one of the following: isopropyl magnesium iodide, isobutyl magnesium iodide, tertiary butyl magnesium iodide; the corresponding 2-(p-methoxyphenyl)-3-(isopropyl, -isobutyl and -tertiary butyl)-6-methoxy-indenes are obtained.

The following examples will serve to illustrate the invention:

EXAMPLE A

*Preparation of 2-(p-methoxyphenyl)-3-isopropyl-6-methoxy-indene*

4.54 grams of magnesium metal turnings and 18 cc. of absolute ether are placed in an apparatus for preparing Grignard reagent and 31.7 grams of isopropyl iodide added in such a manner that the ether is kept constantly refluxing. After the addition of the iodide the mixture is refluxed with gentle heating and stirring for a further hour and then 190 cc. of benzol added to the mixture. To this, 10 grams of 2-(p-methoxyphenyl)-6-methoxy-1-indanone dissolved in benzol is added dropwise. After the addition the mixture is refluxed for a further two hours and after cooling, 25 cc. of 5 per cent sulfuric acid are slowly added, the mixture warmed for half an hour and the reaction mixture then allowed to separate into two layers. The ether layer is removed, washed with water and dried over sodium sulfate. After filtration the ether solution on evaporation leaves a crystalline residue which, on crystallization from methanol yields 2-(p-methoxyphenyl)-3-isopropyl-6-methoxy-indene melting at 134.5–135.5° C.

EXAMPLE B

*Preparation of 2-(p-methoxyphenyl)-3-isobutyl-6-methoxy-indene*

The Grignard reagent is prepared from 9.07 grams of magnesium, 160 cc. of absolute ether and 68.6 grams isobutyl iodide in the manner given in Example A. To this, 20 grams of 2-(p-methoxyphenyl)-6-methoxy-3-indanone dissolved in 380 cc. of benzol are added dropwise and after the addition the mixture is refluxed for two hours and then decomposed with ice with 25 cc. of 5 per cent sulfuric acid. The mixture is warmed for half an hour, the ether layer removed, washed, dried with sodium sulfate and filtered. The ether solution on evaporation gives a crystalline residue which, on recrystallization twice from methanol, yields 2-(p-methoxyphenyl)-3-isobutyl-6-methoxy-indene melting at 75.5–76.5° C.

When tertiary butyl iodide is employed in forming the Grignard agent instead of isobutyl iodide in the same manner is described in Example B, and this reacted with the same indanone, as described, there is obtained 2-(p-methoxyphenyl)-3-tertiary butyl-6-methoxy-indene.

EXAMPLE 1

*Preparation of 1-methylene-2-(p-methoxyphenyl)-3-alkyl-6-methoxy-indenes*

A fulvene is prepared by refluxing on the steam bath under nitrogen, a solution of 0.02 mol of the 2-(p-methoxyphenyl)-3-methyl-6-methoxy-indene in the necessary amount of absolute ethanol for solution with 1.5–3 grams of paraformaldehyde and 7.5 cc. of 28 per cent potassium hydroxide in absolute methanol. After refluxing, the mixture is diluted with water and the fulvene is extracted with ether from the alkaline solution. The ether extract is washed until neutral, dried and evaporated under vacuum. The residue is an oil which crystallizes in a crude stage and is recrystallized from 80 per cent ethanol. In this manner there is obtained 1-methylene-2-(p-methoxyphenyl)-3-methyl - 6 - methoxy-indene-(2,3), M. P. 94–95° C.

By following the same procedure, but starting with the following indenes, namely, a. 2-(p-methoxyphenyl) - 3 - ethyl-6-methoxy-indene-(2,3)
b. 2-(p-methoxyphenyl) - 3 - propyl-6-methoxy-indene-(2,3)
c. 2-(p-methoxyphenyl)-3-isopropyl-6-methoxy-indene-(2,3)
d. 2-(p-methoxyphenyl) - 3 -butyl-6-methoxy-indene-(2,)

the corresponding 1-methylene-derivatives of compounds a, b, c and d are obtained which have the following melting points, respectively:

a. 96.5–97° C.
b. 68–71.5° C.
c. 129–133° C.
d. B. P. 190–200°/0.1 mm.

EXAMPLE 2

*Preparation of 1-methyl-2-(p-methoxyphenyl)-3-alkyl-6-indanes*

The fulvenes described in Example 1 are hydrogenated in ethanol with Raney nickel at 40 pounds pressure. The hydrogenation products are generally obtained as colorless oils. On fractionation of the hydrogenation product in vacuo, the following compounds are obtained:

1-methyl-2 - (p - methoxyphenyl) - 3 - methyl-6-methoxy-indane, B. P. 170°/0.7 mm.
1-methyl - 2 - (p - methoxyphenyl) - 3 - ethyl-6-methoxy-indane, B. P. 170°/0.6 mm.
1-methyl - 2 -(p - methoxyphenyl) - 3 - propyl-6-methoxy-indane, B. P. 150–160°/0.1 mm.
1-methyl-2-(p-methoxyphenyl) - 3 - isopropyl-6-methoxy-indane
1-methyl - 2 - (p - methoxyphenyl) - 3 - butyl-6-methoxy-indane, B. P. 175–180°/0.2 mm.

EXAMPLE 3

*Preparation of 1-methyl-2-(p-hydroxyphenyl)-3-alkyl-6-hydroxy-indanes*

The dialkoxy compounds obtained as described in Example 2 are dealkylated by refluxing one part of each compound with 10 volumes of a mixture of three parts of acetic acid and one part of 40 per cent hydrobromic acid until a sample is soluble in alkali. In the event that prolonged refluxing does not result in a completely alkali-soluble product, a small amount of alkali-soluble material is removed by ether extraction. The alkaline solution is then acidified to Congo paper and extracted with ether. The residue after evaporating the ether is repeatedly recrystallized from 50 per cent methyl alcohol. In this manner the following compounds can be obtained:

1-methyl - 2 - (p-hydroxyphenyl) - 3 - methyl-6-hydroxy-indane, M. P. 195–196° C.
1-methyl - 2 - (p-hydroxyphenyl) - 3 - ethyl - 6-hydroxy-indane, M. P. 195–198° C.
1 - methyl - 2 - (p-hydroxyphenyl) - 3 - propyl-6-hydroxy-indane, M. P. 184–185° C.
1-methyl - 2 - (p-hydroxyphenyl)-3-isopropyl-6-hydroxy-indane, M. P. 174.5–181° C.
1-methyl - 2 - (p-hydroxyphenyl) - 3 - butyl - 6-hydroxy-indane, M. P. 175–182° C.

The dihydroxy compounds as prepared according to Example 3 can be, if desired, subsequently acylated or alkylated to form the corresponding esters or ethers, such as the diesters and diethers or the monoesters and monoethers. By partial dealkylation of the compounds formed by the process illustrated in Example 2, followed by esterification, there can also be obtained the mixed ether esters.

While the above examples illustrate the process as carried out with formaldehyde, thereby producing the 1-methyl-2-phenyl-3-alkyl-indanes, it is to be understood that the process may be carried out with other aldehydes as, for example, acetic aldehyde, propyl aldehyde, butyric aldehyde, and the like. When employing acetaldehyde in a manner similar to that described above, the 1-substituent is an ethyl group. Similarly, when employing propyl aldehyde and butyric aldehyde, the 1-substituent in the indane becomes propyl and butyl, respectively.

Since the fulvenes which are obtained as intermediates are new compounds, it is to be understood that they also form part of the present invention.

I claim:

1. The process which comprises reacting with an aldehyde a compound of the following formula:

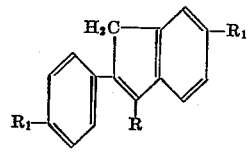

in which R is selected from the group consisting of alkyl and branched alkyl, $R_1$ is an alkoxy radical, and hydrogenating the resulting compound.

2. A process of preparing a 1-alkyl-2-(p-hydroxyphenyl) - 3 - alkyl-6-hydroxy-indane which comprises reacting a 2-(p-alkoxyphenyl)-3-alkyl-6-alkoxy-indene with an aldehyde, hydrogenating the fulvene obtained and converting the alkoxy groups of the resulting indane to hydroxyls by dealkylation.

3. A process as in claim 2 in which the aldehyde is formaldehyde.

4. A process of preparing fulvenes which comprises reacting 2-(p-alkoxyphenyl)-3-alkyl-6-alkoxy-indenes with an aldehyde.

5. A process as in claim 4 wherein the aldehyde is formaldehyde.

6. A process of preparing 1-alkyl-2-(p-alkoxyphenyl)-3-alkyl-6-alkoxy-indanes which comprises hydrogenating fulvenes of 2-(p-alkoxyphenyl)-3-alkyl-6-alkoxy-indenes.

7. A process which comprises reacting 2-(p-methoxyphenyl)-3- methyl - 6 - methoxy - indene with formaldehyde, hydrogenating the fulvene obtained, and converting at least one of the methoxy groups of the resulting indane into an hydroxyl by dealkylation.

8. A process which comprises reacting 2-(p-methoxyphenyl)-3-isopropyl-6-methoxy indene with formaldehyde, hydrogenating the fulvene obtained, and converting at least one of the methoxy groups of the resulting indane into a hydroxyl by dealkylation.

9. 1-methyl-2-(p-hydroxyphenyl)-3-isopropyl-6-hydroxy-indane.

10. 1-methyl-2-(p-methoxyphenyl)-3-isopropyl-6-methoxy-indane.

11. 1-alkyl-2-(p-oxyphenyl)-3-isopropyl-6-oxy-indanes.

ULRICH V. SOLMSSEN.

REFERENCES CITED

The following references are of record in the file of this patent:

UNITED STATES PATENTS

| Number | Name | Date |
|---|---|---|
| 2,281,956 | Salzer | May 5, 1942 |

OTHER REFERENCES

Wuest, "Annalen der Chem.," vol. 415 (1918), pages 308–309.

Thiele et al., Ibid., vol. 347 (1906), pages 262, 265.

Padoa et al., "Gazz. Chim. Ital.," vol. 39, pt. I, page 330.

Masson, "Chemical Abstracts," vol. 39 (1945), page 2120.

Fieser et al., "Organ. Chem." (D. C. Heath & Co., 1944), page 142.

Solmssen, Chem. Rev., vol. 37, No. 3, 593–5 (1945).

Certificate of Correction

Patent No. 2,493,729 January 3, 1950

ULRICH V. SOLMSSEN

It is hereby certified that errors appear in the printed specification of the above numbered patent requiring correction as follows:

Column 1, line 52, for "(1930)" read *(1943)*; column 3, line 13, for "by" read *from*; column 4, line 61, for "is" read *as*; column 6, line 73, for "methoxy indene" read *methoxy-indene*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*